Nov. 26, 1963  M. D. CHAMBERLAIN  3,111,787
SANDWICH ROOFING ELEMENT
Filed Dec. 16, 1960

INVENTOR.
MERLE D. CHAMBERLAIN.
BY Oscar B. Brumback.
his ATTORNEY

United States Patent Office 3,111,787
Patented Nov. 26, 1963

3,111,787
SANDWICH ROOFING ELEMENT
Merle D. Chamberlain, Pittsburgh, Pa., assignor to Koppers Company, Inc., a corporation of Delaware
Filed Dec. 16, 1960, Ser. No. 76,184
2 Claims. (Cl. 50—83)

This invention relates generally to roofing and more particularly to a novel prefabricated waterproof, insulating roofing element.

Heretofore, the application of roofing systems to buildings or to roof decks has required three separate operations: first, the installation of a deck; second, the application of the insulation; and third, the protection of the insulation by the weather coat.

An object of this invention is to provide an improved foamed polymeric core sandwich deck and insulation roofing panel as an integral unit, thus applying the complete roofing system in one operation.

It is another object of this invention to provide such a panel which is weather resistant.

It is still another object of this invention to provide such a roofing element which is a vapor barrier while providing good thermal insulation.

It is a still further object of this invention to provide a laminated roofing element which can be applied to adjoining roofing elements by means of a self-contained cold applied adhesive.

In accordance with this invention, there is provided a self-adhering, insulating roofing material comprised of a foamed plastic core to which has been affixed a skin of plywood, asbestos-cement board or the like whose upper side or exposed surface is coated with a roofing felt which has been cemented to the skin with a coal-tar-pitch-composition or asphalt composition having natural adherescent properties, with extending tabs which are protected prior to use by means of a release paper such as silicone or oil treated parchment papers. In use, the release paper is removed from the tabs and the joint between panels sealed by means of the natural adherence properties of the adhesive composition.

The insulated core may be of a foamed plastic, such as, foamed polystyrene, foamed polyethylene, foamed polyester plastic, foamed polyurethene, foamed phenolic plastic, and the like. Conveniently, the polymeric material may be of polystyrene made of expandable polystyrene, such as that made by Koppers Company, Inc. under the trademark Dylite expandable polystyrene (a granule or bead of polystyrene having incorporated therein from 5–15 parts of a normal aliphatic hydrocarbon having a boiling point of below the melting point of polystyrene).

These expandable polymeric beads may be expanded partly prior to their further expansion into a final article. Particularly useful processes for partially expanding an expandable polymeric material are described in copending United States application of Hugh E. Rodman, Jr. Serial No. 689,195 (and now matured into Patent No. 3,023,175), filed October 9, 1957; and Edwin Edberg and Richard H. Immel, Serial No. 705,540 (and now matured into Patent No. 2,998,501), filed December 27, 1957, in which hot gas, infrared, steam and high frequency radio waves are used to heat the polymeric material to predetermined temperatures for a predetermined time thereby to partially expand a predetermined amount of the polymeric material. Thus the expandable polymeric material expands into a foamed polymeric structure corresponding to the rectangular shape of the molding cavity. Subsequently, foamed or cellular polymeric structures in the shape of boards can be made by charging expandable polymeric materials into a molding cavity and then exposing the polymeric materials to steam injected from a steam source into the molding cavity for predetermined length of time and then automatically removing the source of steam from said cavity. From these boards sandwich type panels can be produced by facing the boards with either flexible or rigid facing materials. Flexible sheets suitable for the preparation of the panel structures useful in this invention include such materials as polymeric sheets, i.e., polyethylene, high impact polystyrene and the like and various metallic foils i.e. aluminum foil. Rigid sheets include plywood, light gage aluminum, light gage steel, hardwood board, vegetable fiber boards, cement asbestos boards, gypsum boards, phenolic type resin impregnated laminates and the like. The opposite surfaces of the facing material are coated with an adhesive in a conventional manner to provide adherence between the cellular polymeric structure and the facing materials. Various adhesives can be used, for example, sodium silicate, polyvinyl alcohol, resorcinol-formaldehyde resins, phenol-modified resorcinol-formaldehyde resins, polystyrene latices, and the like can be used. Generally speaking, elastomeric-type adhesives are quite suitable. It is this completed board expanded within skins of plywood or the like made as hereinabove described that is preferred for use as the foamed plastic core of this invention. The material useful as the core for this invention is, however, not limited to that described. Other materials such as those described in F. L. Johnston United States Patent 2,256,483 in which a resilient porous solid is made by incorporating a gas into a molten ethylene polymer and substantially cooling the resulting forth.

The self-adhering bituminous adhesives are described in detail in two copending applications which are filed concurrently herewith and assigned to the assignee of the invention.

Briefly, the adhesive composition as described in the concurrently filed application Serial No. 76,185 of John J. Lane and Lawrence F. Flaherty comprises a solution of coal and an acrylonitrile butadiene copolymer dissolved in a mixture of coal tar pitch and high boiling aromatic oil. In general, this composition comprises by weight from 28–35% coal tar pitch, 40–47% heavy creosote oil, 20–48% coal, 1–25% synthetic rubber and sufficient filler such as clay, carbon black, and the like to control the tackiness of the compositions.

As a specific example of the coal tar pitch composition used in this invention, 40 parts of high boiling aromatic oil are added to 30 parts of coal tar pitch. Temperature of this mixture is raised to 350° F. and 40 parts of pulverized coal added. The mixture is then placed in an agitated still and heated to a temperature of 600° F. and held at this temperature until the coal dissolves. The mixture is then cooled to 300° F. and 5 parts of a medium weight copolymer of butadiene acrylonitrile in a 75:25 ratio added. The mixture is then maintained at 300° F. for four hours after which 50 parts of ball clay are added and mixed for three hours. The product has the characteristics of a black heavy creamy material having a viscosity while hot at 250° F. using a Brookfield Viscometer of between 20,000 and 40,000 centipoises.

The adhesive composition as described in the concurrently filed application Serial No. 76,357 of John J. Lane and B. Otto Wheeley comprises a solution of asphalt, butyl rubber and high boiling petroleum oil. In general this composition comprises from by weight 40–80% asphalt, 2–25% butyl rubber, 2–25% petroleum oil and 0–30% of a filler material such as clay, carbon black and the like which filler may be added to control the tackiness of the composition. As a specific example of the asphalt composition used in this invention, 12 parts of butyl rubber are added to 100 parts of 85–100 penetration asphalt at 300° F. and agitated until the butyl dissolves, one hour. To this is added 6 parts of high boiling petroleum oil and with the temperature maintained at 300–325° F. mixed until solution occurs. To this is added 32 parts of ball clay and agitated until the clay is completely dispersed. The resultant product has a Brookfield viscosity at 250° F. using 12 r.p.m. and No. 4 spindle of 8,000 to 20,000 cps. and a penetration at 77° F., 100 gm., 5 seconds of 50–90 mm. (ASTM D-5).

Conveniently, it has been found that a silicone treated film, such as that sold by the KVP Paper Company, will produce a relatively weak bond with the adhesive composition thereby making slicone treated paper the ideal protective release paper for this composition. The silicone treated release paper protects the adhesive to an extent when removed, that the adhesive has sufficient tack to form a perfect bond with whatever surface it is contacted.

The protective material useful as the upper layer of the laminated roofing element of this invention is any well-known roofing felt such as tar saturated asbestos felt. The choice of roofing material is not critical because the hereinabove described adhesive will substantially bond itself to any known roofing material.

If desirable the sandwich roofing elements after being placed in position as a unitary roof may be further coated with other weather protective materials. A preferred additional weather coating is an aqueous emulsion which dries to a waterproof, vaporproof, weatherproof, hard film. The preferred aqueous emulsion is formed by (1) dissolving 5.1% a copolymer of acrylonitrile and butadiene in coal tar, (2) forming an aqueous slurrry containing pigment, and (3) blending the solution and slurry, and (4) subjecting the blend to intense shearing action, whereby an aqueous emulsion is formed. This emulsion will dry to a continuous film adhering to the outer surface of the weathering side of the roofing element. This novel emulsion is described in detail in copending application Serial No. 807,101, now matured into Patent No. 3,027,342. As described in the copending application, the emulsion for use in this invention is prepared from a solution of from 1–5% by weight of a copolymer of acrylonitrile and butadiene in coal tar and an aqueous slurry containing 12–45% by weight of a pigment.

The roofing elements of this invention can be prepared readily and economically by preforming the foamed polymeric core, adhering selected facing sheets thereto in a manner hereinabove described and coating, by brushing, rolling, spraying, etc., the top facing material with the self-adhering adhesives herein described. Subsequently the protective material such as a tar saturated asbestos felt is placed over the adhesive with at least one side of the saturated tar asbestos felt overlapping the preformed core. The under side of the overlapping felt is coated with the novel adhesive and then covered with a silicone treated film useful as a release paper. Under such conditions and using the tar saturated asbestos felt, the foam cores with facing sheets and the adhesive compositions already described, a cold applied roofing element is produced which can readily be applied as a built up roof to any building by merely removing the release paper from the overlapping roofing felt and bonding the adhesive part of the overlap to the abutting roofing element. The application of heat is unnecessary to effect a permanent board between the overlapping and the abutting roofing element. The provision of the overlapping members insures that the total roof will be completely waterproof and weatherproof.

The size of the roofing elements is not critical. Elements of varying sizes can be made and the size only depends upon the particular design of the building and its substructure to which they are to be applied.

The invention will appear more fully when it is read in connection with the attached drawings. It is to be understood, however, that the drawings are not intended as a definition of the invention but are for the purpose of illustration only.

Figure 1:
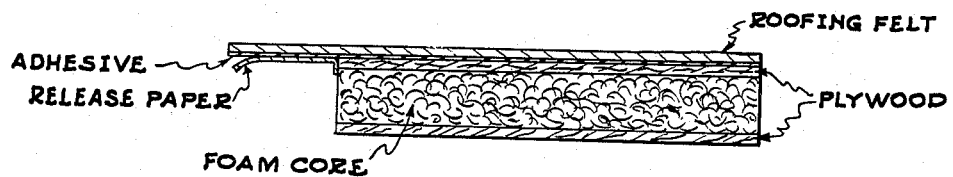
FIGURE 1 is a side view of the roofing element embodying the features of this invention.
Figure 2:
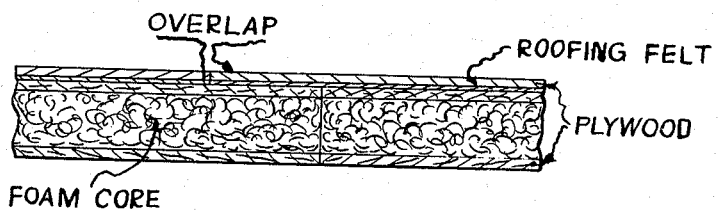
FIGURE 2 represents one modification of this invention illustrating the ease with which the elements can be placed adjacent one another simply by removing a release paper.

Referring to FIGURE 1, the modification of the invention shown comprises: a lightweight foam core surrounded by, on the top side, a plywood facing, adhesive, and roofing felt and on the bottom side, a plywood facing sheet. The overlapping portion of roofing felt, adhesive and release paper are also shown. As illustrated in FIGURE 2, the release paper may be, by simply pulling, be removed and the roofing element placed in position securing thereby an instantaneous bond between the roofing elements.

According to our procedures, the prefabricated elements are placed into position side by side over the purlins of a building and the overlapping portions placed atop abutting elements so as to form a waterproof covering between elements. The number of overlapping portions is controlled according to roof design. If the elements contain unnecessary overlaps, they can be removed in the field simply by cutting along the side of the facing and foam materials of the elements.

Because there is no solvent action of the bonding composition, on the facings of the element there is no deformation or warping of the roofing elements during storage or application to a roof. Because of this fact the finished roofing elements can be stored for a long period of time without losing any dimensional accuracy or stability. The sandwich element is well adapted to continuous manufacture without requiring the use of elevated temperature and pressure to secure the adhesive or to obtain a bond between the adhesive and the panel. This is particularly important because there should be no heat higher than the softening point of the polymeric foam material from which the core is made. The thus formed sandwich roofing element is impervious to moisture and air and is highly resistant to injury by exposure to adverse weather conditions. Because of its high heat insulating value, the panel is ideally suited as a roofing element to either retain heat within a structure or to prevent temperature variations within a building which could be caused by outside weather conditions. The application of the release paper to the adhesive is for the purpose of retaining sufficient tack in the adhesive so as to allow the formation of a permanent bond with the abutting panels when the complete element is used as a built up roofing material.

I claim:

1. An integral roof deck and insulation panel comprising a core of foamed polystyrene whose upper and lower surfaces having affixed thereto plywood facing material, said upper facing material being adhered to a tar saturated asbestos felt by means of an acrylonitrile butadiene coal-tar pitch adhesive comprised of from by weight 28% to 35% coal-tar pitch, 40% to 47% heavy creosote oil, 20% to 28% coal, and 1% to 25% acrylonitrile butadiene, said roofing felt and adhesive being in overlapping relationship to the upper facing material, the adhesive overlapping portion being protected prior to use by means of a silicone treated film.

2. An integral roof deck and insulation panel comprising a core of foamed polystyrene whose upper and lower surfaces having affixed thereto plywood facing material, said upper facing material being adhered to a tar saturated asbestos felt by means of a butyl rubber asphalt adhesive comprised of from by weight 40% to 80% asphalt, 2% to 25% butyl rubber and 2% to 25% high boiling petroleum oil, said roofing felt and adhesive being in overlapping relationship to the upper facing material, the adhesive overlapping portion being protected prior to use by means of a silicone treated film.

References Cited in the file of this patent

UNITED STATES PATENTS

| | | |
|---|---|---|
| 70,030 | Scanlan | Oct. 22, 1867 |
| 985,140 | Button | Feb. 28, 1911 |
| 1,568,227 | Leonard | Jan. 5, 1926 |
| 1,592,760 | Fischer | July 13, 1926 |
| 2,148,167 | Lyman | Feb. 21, 1939 |
| 2,164,712 | Kirschbraun | July 4, 1939 |
| 2,433,728 | Attwell | Dec. 30, 1947 |
| 2,642,818 | Talmey | June 23, 1953 |
| 2,863,405 | Liebrook et al. | Dec. 9, 1958 |
| 2,896,271 | Kloote et al. | July 28, 1959 |

FOREIGN PATENTS

| | | |
|---|---|---|
| 578,407 | Canada | June 23, 1959 |
| 1,225,599 | France | Feb. 15, 1960 |

OTHER REFERENCES

The Condensed Chemical Dictionary, by Reinhold Publishing Corp., New York, fifth edition; 3rd printing, 1958, pages 421 and 981.